United States Patent [19]
Grund et al.

[11] 3,822,399
[45] July 2, 1974

[54] CIRCUITRY FOR DETECTING MAXIMUM VALUES OF A SIGNAL SEQUENCE

[75] Inventors: Karl Grund; Erich Courtin, both of Sindelfingen; Stefan Traub, Boblingen; Helmut Zeeb, Kirchentellinsfurt, all of Germany

[73] Assignee: Hewlett-Packard GmbH, Bolingen, Germany

[22] Filed: Aug. 28, 1972

[21] Appl. No.: 284,315

[30] Foreign Application Priority Data
Sept. 2, 1971 Germany............................ 2143971

[52] U.S. Cl. .......... 324/103 P, 328/151, 307/235 A
[51] Int. Cl............................................ G01r 19/16
[58] Field of Search ......... 324/189, 103 P; 328/150, 328/151; 307/235 A

[56] References Cited
UNITED STATES PATENTS
3,541,457 11/1970 Leighty et al. .............. 324/103 P X
3,553,593 1/1971 Gedance .......................... 328/150 X
3,596,179 7/1971 Hunter ............................ 324/103 P

OTHER PUBLICATIONS

Ristad; IBM Tech Discl. Bull.; January 1973, p. 2377.

Primary Examiner—Alfred E. Smith
Attorney, Agent, or Firm—A. C. Smith

[57] ABSTRACT

Circuitry for the determination of the instants of, and the time intervals between, maximum values of signals of varying amplitude and wave form includes an idealized diode connected to a capacitor. A discriminator responsive to the termination of the charging current to the capacitor actuates a delay circuit. If no greater amplitude appears during the delay period, a switch activates a pulse generator to deliver an impulse indicative of the instant the maximum value appeared.

9 Claims, 1 Drawing Figure

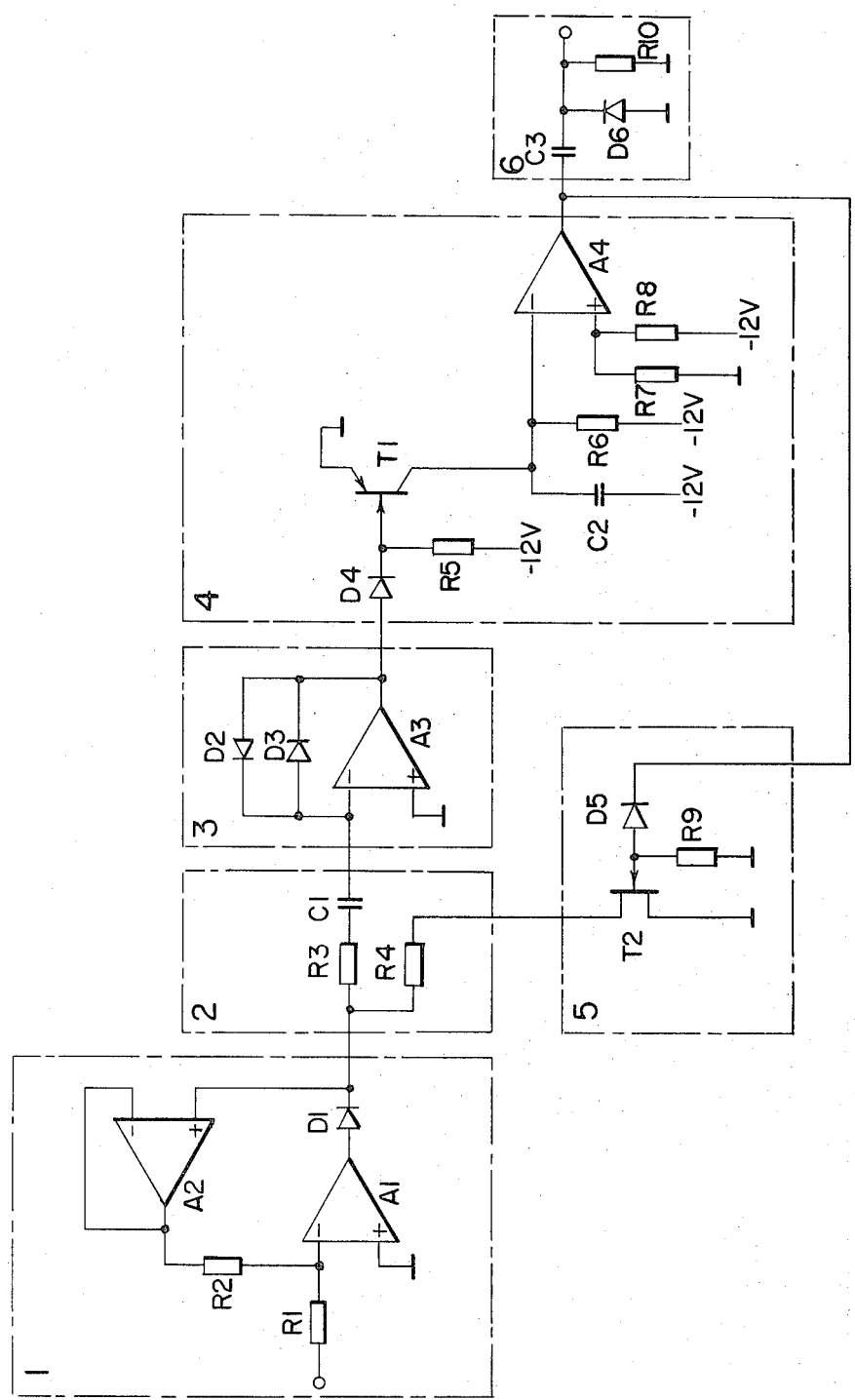

CIRCUITRY FOR DETECTING MAXIMUM VALUES OF A SIGNAL SEQUENCE

BACKGROUND OF THE INVENTION

Circuitry for detecting the maximum amplitude of an impulse is well known. Typically, the input signals are applied to the base electrode of a transistor after passage through a differentiating member. The signals act to charge a storage capacitor connected to a discharge resistor. The charging current for the capacitor causes a voltage drop at a collector resistor until the charging currents is terminated. During the charging action the capacitor is simultaneously discharged via an emitter resistor. Unfortunately, the measuring accuracy of this type of circuitry is limited as the capacitor will not be charged to a value indicative of the maximum value of the input impulse. This is due to the variable resistance of the base-emitter path of the transistor, and to shape variations in the signals near the region of the maximum value. For example, during the charging of the storage capacitor a flat voltage maximum will tend to cause a greater discharge by the discharging resistor than would be the case with a steeper input signal.

Further, many people have tried to generate envelopes of equal amplitude by using control circuits to activate a Schmitt-Trigger at a predetermined level of the envelopes. Because of the variations in the envelope shape, however, there is no precise correlation between the trigger levels and the signal maxima.

SUMMARY OF THE INVENTION

The main objective of the present invention is to provide improved circuitry for the determination of the instants of maximum values of signals of varying amplitude and shape. Typically, such signals may be obtained from ultrasonic signals from the fetal heart beat.

The invention is in part based on the idea that dependent on the kind of signal source there will be certain regular signal characteristics, even if the signal shapes have substantial irregularities. There are certain values of smallest and greatest possible time period between maxima, amplitude ratio of subsequent maximum values related to the time interval between them, and amplitude ratio of the greatest and smallest signal maxima over an indefinite time interval. Subsequently, these concepts are referred to as time period limits, short time dynamics, and long time dynamics, respectively.

Circuitry for determining the time intervals between subsequent maximum values of a sequence of signals includes rectifier means, storage means connected to the rectifier means, an impulse generator responsive to the charging current of the storage means, and a discharge circuit for the storage means. The rectifier means includes a circuit simulating an idealized diode. Upon termination of the charging current, the storage means actuates a switching means to discharge the storage means to a value smaller than the smallest subsequent maximum value to be measured. This discharge takes place even within the time interval between closest maximum values. Subsequently, the switching means interrupts the discharge circuit. According to the invention a substantially more accurate time determination of the maxima is achieved because the charging of the storage circuitry is not affected by the forward resistance and the back conductance of a semiconductor element. Nor is the accuracy affected by the simultaneous partial discharge of the storage element. The circuitry is designed with a view to the shortest time period between maxima and with a view to the short time dynamics of the input signals. The storage means is charged to show the proper maximum value and is then intermittently discharged without obscuring subsequent signal maxima.

Preferably, the circuitry for simulating an idealized diode includes an operational amplifier, a diode in series with the operational amplifier, and a negative feedback loop for biasing the diode and the operational amplifier. This feedback loop can include an impedance transformer. The first operational amplifier and the subsequent diode not only simulate an idealized diode but also allow neglecting the input circuit of the diode.

The storage means may include a capacitor and a resistor to form a low-pass filter. Because the charging current of the capacitor is porportional to the differential of the charging voltage, the capacitor is not affected by steep noise impulses of low amplitude.

Further, a discriminator can be connected between the storage means and the switching means for discharge of the storage means. This discriminator can include a negative feedback operational amplifier having a bias current opposite to the charging current. Thus output signals are delivered in which the positive or the negative zero crossing corresponds to the instant of current reversal in the feedback loop of the operational amplifier. When the charging current of the capacitor becomes equal and opposite to the bias current of the operational amplifier, the polarity of its output voltage is reversed. The zero crossing of the output voltage is shifted relative to the instant of termination of the charging current only by the amplitude of the bias current, and thus allows more accurate time determination of the maximum than would otherwise be obtained.

The operational amplifier of the discriminator may have two negative feedback loops, each with an oppositely polarized diode. Because of the exponential characteristics of the diodes, the output voltage of the operational amplifier is nearly independent of the input current. Thus, the circuitry can be operated over a wide range of input amplitudes.

Still further, a delay means between the discriminator and the switching means may be provided for discharging the storage means. The delay means effects storage of a "preliminary" maximum value. If the time delay elapses and no greater maximum value has caused further charging of the storage means, the preliminary maximum value is assumed to be proper, and the discharge of the storage means is initiated. The delayed signal is then used to deliver an impulse. This impulse is delayed by a predetermined time and is indicative of the time of signal maximum. The delay period of the delay means, however, will again be initiated if a greater signal maximum appears within the delay period.

The discharge circuitry is especially simple when the storage means is discharged with an exponential characteristic. In this case the time constant of the exponential characteristic is determined by the following condition: In the smallest possible time interval between succeeding maxima, the storage means should be discharged to a value which, according to the known short time dynamics of the signals to be measured, is smaller than the samllest possible subsequent maximum value.

The discharge in the form of an exponential function has been suitable for measuring signals derived from ultrasonic measurements of the fetal heartbeat frequency. However, there are possible signal sequences in which another kind of discharge characteristics for the storage means would be desirable. In this case the discharge circuit may include a constant current voltage controlled by the stored voltage.

DESCRIPTION OF DRAWINGS

The FIGURE shows a schematic of the circuitry for detecting maximum values of a signal sequence.

DESCRIPTION OF THE PREFERRED EMBODIMENT

Referring now to the FIGURE, the circuitry includes an idealized diode 1, a storage means 2, a charging current discriminator 3, a delay means 4, and an electronic switch 5. The switch 5 is connected in the discharge circuit of the storage means 2. The delay means 4 is also connected to a differentiating means 6. The circuit components are as follows: The idealized diode 1, includes an operational amplifier A1, a resistor R1, a diode D1, and a feedback loop biasing the diode and the operational amplifier. This feedback loop includes an operational amplifier A2 designed to operate as a voltage follower, which is connected to the inverting input of the operational amplifier A1 through a resistor R2. The non-inverting input of operational amplifier A1 is connected to ground.

The storage means 2 includes resistor R3, resistor R4, and capacitor C1. Resistor R3 is connected to the cathode of the diode D1 and to one terminal of a discharge resistor R4. The other terminal of capacitor C1 is connected to the charging current discriminator 3.

The charging current disciminator 3 includes an operational amplifier A3 and a feedback loop with two oppositely polarized parallel connected diodes D2D3. and The non-inverting input of operational amplifier A3 is connected to ground.

The delay means 4 includes a transistor switch, an RC combination, and a subsequent comparator.

The transistor switch includes a transistor T1, with the emitter connected to ground, the base connected to the output of operational amplifier A3 via a diode D4, and the collector to a source for a −12 V potential via a resistor R5.

The RC combination includes a resistor R6 and a capacitor C2. The junction of both components is connected to the collector of the transistor T1 and to the non-inverting input of operational amplifier A4 of the comparator. The other terminals of the resistor and capacitor are connected to a −12 V potential.

The comparator includes an operational amplifier A4. The non-inverting input of this operational amplifier is connected with the −12 V potential via resistor R6, and with ground via resistor R7.

The electronic switch 5 includes a field effect transistor T2 having source electrode connected to ground. The gate electrode is connected to ground via a resistor R9, and to the output of operational amplifier A4 via diode D5. The drain electrode of the field effect transistor T2 is connected with the input of the storage means 2 via discharge resistor R4.

The output differentiating means 6 includes a capacitor C3 connected to a resistor R10 and a diode D6. The junction of capacitor C3 and resistor R9 is the output of the circuitry, while diode D6 and resistor R10 have their other terminals connected to ground.

The circuitry can be operated in the following manner: Assume the times of negative maxima of an input signal of varying shape and amplitude are to be determined. This signal is applied to the input of the circuitry, i.e., to resistor R1. During the negative half wave of the input signal, diode D1 is conductive. The negative feedback loop of the operational amplifier causes a potential at the cathode of diode D1 corresponding to the input voltage. The potential at the cathode has a 180° phase shift relative to this input voltage. Diode D1 blocks a positive input signal and interrupts the negative feedback loop. The amplifier thus delivers the negative saturation voltage, and the cathode of diode D1 remains at the previously attained potential.

While diode D1 is conductive, capacitor C1 is charged. The charging current is fed to the feedback loop of operational amplifier A3 via diode D3. There it generates a negative output voltage. When the maximum value of the input signal occurs, the charging current of capacitor C1 becomes smaller than the bias current of operational amplifier A3. Thus the bias current of operational amplifier A3 supplied by the charging current will be supplied via diode D2. This results in a polarity reversal of the output voltage upon termination of the charging current. Thus, operational amplifier A3 operates as a charging current discriminator. Due to the bias current of amplifier A3, the change of current direction in the feedback loop of the discriminator will occur slightly after the actual arrival of the signal maximum. This time delay, however, is so small that it can be neglected. Thus the time of zero crossing from negative to positive output voltage is an excellent indication of the appearance of a signal maximum. As long as the input signal increases, thus charging the storage capacitor C1, the output of amplifier A3 will have a negative potential. Therefore, diode D4 will be blocked, transistor T1 will be conductive, and capacitor C2 of the delay means will be charged. As soon as the polarity of the output voltage of amplifier A3 is reversed, however, the diode will become conductive and transistor T1 will be blocked. Thus capacitor C2 will be discharged via resistor R6 according to an exponential characteristic. The time constant of the exponential characteristic will be determined by resistor R6 and capacitor C2.

The operational amplifier A4 operates as a comparator and includes a voltage divider at its non-inverting input to establish a reference potential. As soon as the voltage of capacitor C2 reaches this reference voltage, the output voltage of the comparator switches from a negative to a positive saturation value. The voltage step at the output of comparator A4 will be differentiated and thus deliver the desired output impulse for fixing the time of the signal maximum which was delayed by the holding time of the delay means.

With a positive edge of the output voltage of comparator A4, the field effect transistor T2 will be made conductive. Thus, discharge resistor R4 will be connected to ground, and storage capacitor C1 can be discharged by resistors R3 and R4. The holding time determined by resistor R6 and capacitor C2, and the time constant of the discharge action determined by capacitor C1 and resistors R3 and R4 are dimensioned to give the storage capacitor time to discharge even within the shortest time period expected of the signal maximum. Thus even the smallest signal maximum to be expected will result in a new charging of the capacitor. The ratio of the amplitudes of the signal maxima succeeding each other in the shortest possible time has been defined as short time dynamics of the input signal and is a known parameter. The discharge circuit remains closed until diode D1 is forward biased by an input signal. When the diode again turns conductive and the charging current for capacitor C1 flows, the output voltage of amplifier A3 will once again have a negative potential and will open transistor T1. Thus, capacitor C2 will be charged and at the output of comparator A4 will again appear a negative saturation potential. This potential blocks the field effect transistor T2 and the discharge circuit is interrupted.

The circuitry shown in the FIGURE has proved especially useful for evaluation of bio-electric signals, e.g., ultransonic signals, electrocardiographic signals, and blood pressure signals. The invention is useful whenever it is important to determine the time of signal maxima of a sequence of signals of varying shape and amplitude.

We claim:

1. Circuitry for determining the times at which the maximum values of a sequence of signals occur, comprising:
    energy-storage means;
    rectifier means connected to receive the sequence of applied signals for energizing the energy-storage means during the period the applied signal is attaining peak value;
    discriminator means connected to said storage means for producing an output trigger in response to the energizing current attaining substantially zero value on an applied signal, said discriminator means including an operational amplifier having two negative feedback loops, each of which has an oppositely polarized non-linear element, said operational amplifier being biased by an electrical signal opposite to the energizing current; and
    discharging means connected to de-energize the energy-storage means in response to an output trigger produced by said discriminator means.

2. Circuitry as in claim 1 wherein the two elements are diodes.

3. Circuitry for determining the times at which the maximum values of a sequence of signals occur, comprising:
    energy-storage means;
    rectifier means connected to receive the sequence of applied signals for energizing the energy-storage means during the period the applied signal is attaining peak value;
    discriminator means connected to said storage means for producing an output trigger in response to the energizing current attaining substantially zero value on an applied signal; and
    discharging means connected to de-energize the energy-storage means in response to an output trigger produced by said discriminator means.

4. Circuitry as in claim 3 comprising delay means connected between said discriminator means and said discharging means for activating said discharging means to de-energize said energy-storage means at a time after said output trigger is produced by said discriminator means.

5. Circuitry for determining the times at which the maximum values of a sequence of signals occur, comprising;
    energy-storage means;
    rectifier means connected to receive the sequence of applied signals for energizing the energy-storage means during the period the applied signal is attaining peak value;
    discriminator means connected to said storage means for producing an output trigger in response to the energizing current attaining substantially zero value on an applied signal;
    discharging means connected to de-energize the energy-storage means in response to an activating signal applied thereto; and
    delay means connected between said discriminator means and said discharging means for activating said discharging means to de-energize said energy-storage means at a time after said output trigger is produced by said discriminator means, said delay means including a comparator, a source of reference signal connected to said comparator, and an actuatable source of time-varying signal connected to said comparator, said source of time-varying signal becoming actuated to apply time-varying signal to said comparator in response said output trigger from the discriminator means, and said comparator applying activating signal to said discharge means in response to said time-varying signal and said reference signal attaining a predetermined relationship.

6. Circuitry as in claim 3 wherein the discriminator means includes an operational amplifier having a negative feedback loop and biased by an electrical signal opposite to the energizing current.

7. Circuitry as in claim 3 wherein the rectifier means includes:
    an operational amplifier;
    a diode connected in series with the operational amplifier;
    a resistor;
    an impedance transformer connected in series with the resistor; and
    the amplifier-diode series combination and the transformer-resistor series combination are connected in parallel.

8. Circuitry as in claim 7 wherein the impedance transformer includes an operational amplifier with a negative feedback loop.

9. Circuitry as in claim 3 wherein said energy-storage means includes a capacitor.

* * * * *